June 20, 1967     R. L. PERSONS     3,326,559
ROTARY SEALS
Filed Aug. 13, 1964
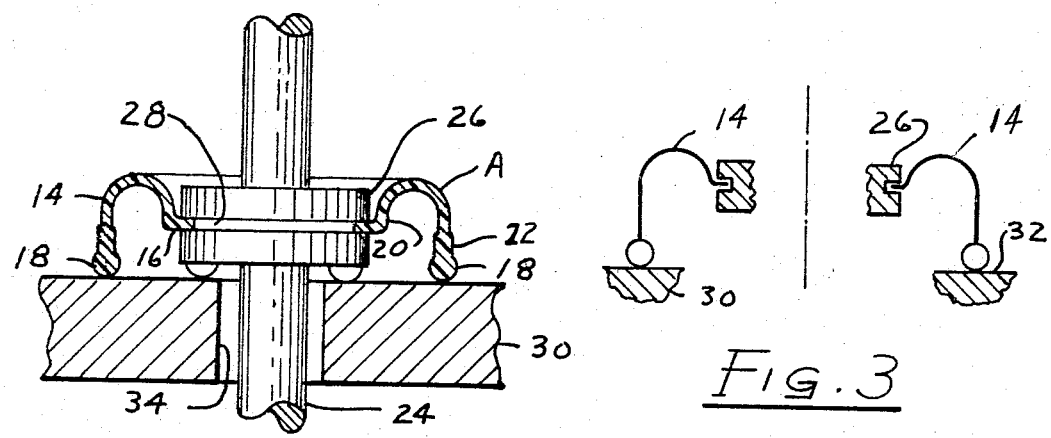
Fig 1
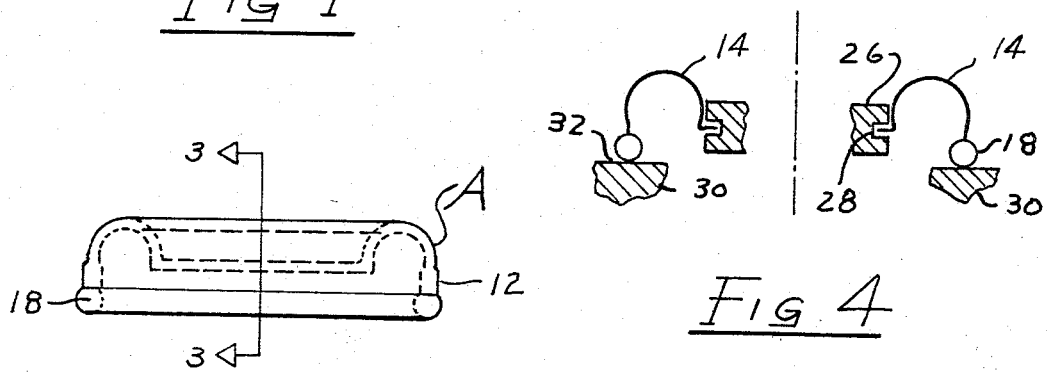
Fig.2
Fig.3
Fig 4
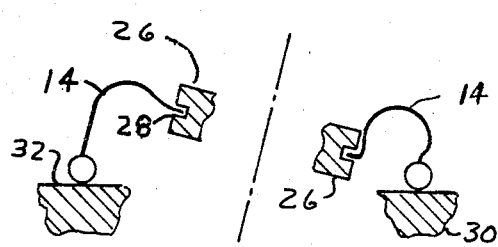
Fig.5
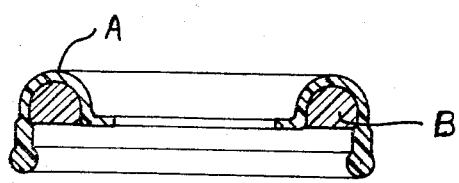
Fig 6
INVENTOR.
RICHARD L. PERSONS
BY
Joseph A. Fenlon, Jr.
ATTORNEY

United States Patent Office 3,326,559
Patented June 20, 1967

3,326,559
ROTARY SEALS
Richard L. Persons, St. Louis, Mo., assignor to
Joseph A. Fenlon, St. Louis, Mo.
Filed Aug. 13, 1964, Ser. No. 389,333
5 Claims. (Cl. 277—95)

My invention relates to self-biasing rotary seals and in particular to rotary seals which adapt themselves to retain a seal notwithstanding misalignment.

It is the object of this invention to provide a rotary seal for use with between elements which rotate with respect to each other and which will protect such elements from any harmful, corrosive and clogging effects of the environment in which they are used. It is a further object of this invention to provide a seal of the type described which is independent of the alignment of the said elements.

It is also an object of this invention to provide a seal of the class described in which the material used to construct the seal and the details of construction of the seal coact to develop a continuous biasing force between the relatively rotatable elements.

In the drawings:

FIGURE 1 is an elevational view of an embodiment of this invention operatively installed with a diametral half of the seal cut away;

FIGURE 2 is a front elevational view of my seal;

FIGURE 3 is a mechanical schematic view of a properly installed seal;

FIGURE 4 is a mechanical schematic view of a seal installed where the shaft is longitudinally misaligned;

FIGURE 5 is a mechanical schematic view of a seal installed with the rotational axis misaligned; and FIGURE 6 is a diametral sectional view of a second embodiment of this invention.

Referring now in more detail and by reference character to the drawings, which illustrate preferred embodiments of this invention, A designates a rotary seal comprising an endless band 12 of material folded over on itself to define a continuous annular channel 14 which is provided on its margin of shorter dimension with an inwardly projecting flange 16 and which is further provided on its larger margin with a continuous annular bead 18. The band 12 is of substantially constant width except in the immediate vicinity of the flange 16 where the channel 14 is integrally provided with a reinforcing area 20 and in the immediate vicinity of the bead 18 where the channel 14 is provided with a second reinforcing portion 22.

The band 12 is fabricated of a plastic, similar to Kynar, which has high corrosion, temperature and abrasion resistances; a low coefficient of friction; and high spring and tensile characteristics.

The seal is used with a rotatable shaft 24 provided with a bearing race 26 having an annular recess 28 integrally included therein. The shaft 24 projects through and rotates with respect to a stationary plate 30 having a bearing surface 32 and provided with a feed-through aperture 34. The channel 14 is sized so that the separation between the flange 16 and the bead 18 is substantially larger than the separation between the recess 28 and the bearing surface 32. Therefore, when the seal A is installed with the flange 16 in the recess 28, tensile forces will develop urging the bead 18 snugly against the bearing surface 32 about the entire periphery of the bead 18. The natural characteristics of the plastic material used to fabricate the seal A render the seal flexible and permit the seal A to elongate, compress and bend unevenly without unseating, thus providing a seal A which is self-compensating for axial play and misalignment as can be seen in FIGURES 3–5 inclusive. It has been found that the seal will compensate with flexure amounting to 25 percent of its installed height.

It should be here noted that the seal A rotates with the shaft 24 and the bead 18 moves with respect to the bearing surface 32.

Referring now to FIGURE 6, a second embodiment of the present invention is shown in which the channel 14 in its uninstalled configuration is filled with an elastomer foam B to provide a poured-in-spring. The elastomer foam B may be varied in cellular density, quantity, cellular type, and durometer hardness to vary the added spring action of the seal A.

It should be understood that changes in the form, construction, combination, and arrangements of the various parts may be made and substituted for those herein shown without departing from the nature and principle of my invention. Having thus described by invention, what I desire to secure by Letters Patent is recited in the following claims.

What I claim is:

1. A rotary seal for use with a rotatable shaft provided with a fixed collar having an annular recessed groove integrally provided therein, and a stationary member having a relatively flat surface presented toward the collar and also being provided with an aperture through which the shaft extends; said rotary seal comprising an endless band folded over on itself to define a U-shaped channel having a bight and a pair of spaced parallel legs, the bases of the legs each being terminated in inner and outer annular margins, the inner margin being diametrally smaller than the outer margin and the bight of the channel being presented away from the flat surface, said inner margin being sealedly disposed within the recess and said outer margin being presented to the flat surface, said inner margin being located in a plane which lies intermediate the plane defined by the bight and the plane defined by the outer margin.

2. The seal of claim 1 wherein the inner leg of the channel is shorter than the outer leg.

3. The seal of claim 1 wherein the inner margin of the channel is provided with an inwardly extending flange adapted to seat snugly within the recess for causing the seal to rotate with the shaft.

4. The seal of claim 1 wherein the inner margin of the channel is provided with an inwardly extending flange adapted to seat snugly within the recess for causing the seal to rotate with the shaft and the outer margin is provided with an enlarged bead.

5. The seal of claim 4 in which the channel is filled with an elastomer foam.

References Cited

UNITED STATES PATENTS 2,478,649   8/1949   Wightman _____ 277–95

FOREIGN PATENTS 240,729   10/1925   Great Britain.

LAVERNE D. GEIGER, *Primary Examiner.*

D. MASSENBERG, *Assistant Examiner.*